United States Patent [19]

Maddens

[11] Patent Number: 4,780,886
[45] Date of Patent: Oct. 25, 1988

[54] DEVICE FOR DETECTING A DATA SIGNAL ENERGY DROP

[75] Inventor: Francis Maddens, La Colle Sur Loup, France

[73] Assignee: International Business Machines Corporation, Armonk, N.Y.

[21] Appl. No.: 874,912

[22] Filed: Jun. 16, 1986

[30] Foreign Application Priority Data

Aug. 2, 1985 [FR] France .................. 85 30024

[51] Int. Cl.⁴ ............... H04L 25/02; G08B 21/00
[52] U.S. Cl. .................... 375/76; 307/358; 328/147; 340/663
[58] Field of Search .......... 375/76, 102, 104; 307/351, 358; 328/116, 115, 117, 149, 147; 364/829, 733; 358/336; 340/663

[56] References Cited

U.S. PATENT DOCUMENTS

| | | | |
|---|---|---|---|
| 3,479,599 | 11/1969 | Molik | 375/76 |
| 4,160,175 | 7/1979 | Trout | 307/351 |
| 4,199,729 | 4/1980 | Durand et al. | 307/351 |
| 4,434,378 | 2/1984 | Ballentine, Jr. | 307/358 |

FOREIGN PATENT DOCUMENTS 1237451  6/1971  United Kingdom ............... 364/733

Primary Examiner—Benedict V. Safourek
Assistant Examiner—Andrew J. Telesz, Jr.
Attorney, Agent, or Firm—Gerald R. Woods

[57] ABSTRACT

The digital samples (An) representing the components in phase (X) and quadrature (Y) of data signals, are digitally integrated by the assembly comprised of multipliers (14 and 15) and an adder (16). The energy signal (Bn) which is obtained, is loaded into a register (17) so as to be provided with the energy signal obtained on the preceding sampling time. The value (Bs) of the energy signal from which the energy signal decrease rate exceeds a predetermiined value, is loaded into a register (21). Then a comparator (23) provides a binary 1 signal transmitted on the output line (25) as the energy drop signal when the value of the energy signal (Bn) has fallen below a predetermined fraction of the value (Bs) stored in register (21).

10 Claims, 4 Drawing Sheets

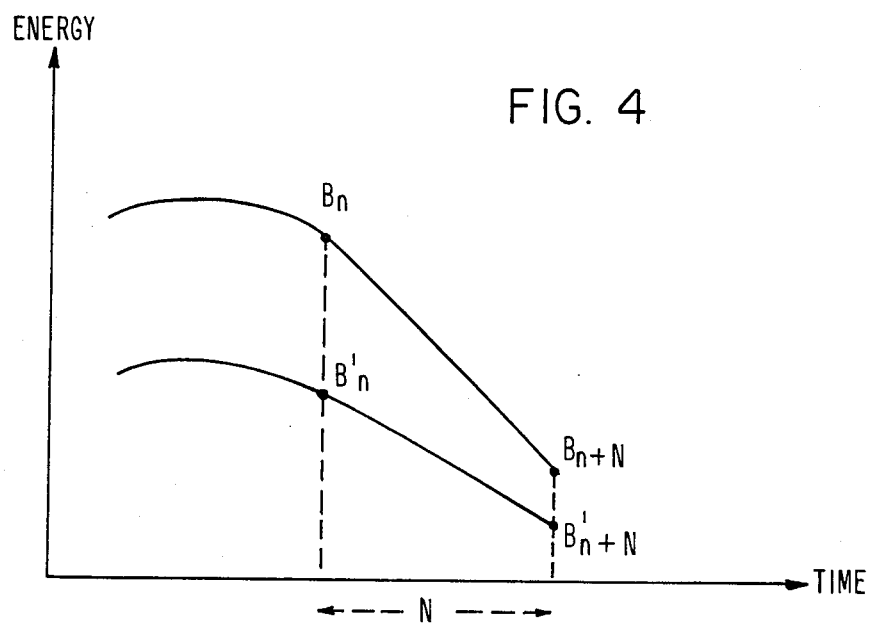

DEVICE FOR DETECTING A DATA SIGNAL ENERGY DROP

FIELD OF THE INVENTION

This invention relates to data transmission by means of analog signals and more particularly to a method and device for detecting the energy drop of a data signal received by the receiver of a system transmitting or receiving data in the form of analog signals.

BACKGROUND ART

In systems for transmitting and receiving data in the form of analog signals over telephone lines, the data are represented by modulation states of a carrier signal. The modulation states are taken from a finite set of discrete amplitude and/or phase values. In general, the carrier signal is modulated by a modulator at the transmission end and demodulated by a demodulator at the reception end, the modulator/demodulator assembly being called a "modem".

Some transmission systems operate in "continuous carrier" mode, i.e. the carrier signal is transmitted over the telephone line even when there is no data transmitted.

But in some other transmission systems, such as multipoint communication systems, the terminals are requested to take turns in transmitting their data to the control system. Then, when a terminal ceases transmitting, it is necessary to interrupt the carrier as well in order to allow the control system to give another terminal the opportunity to transmit. Since it is impossible to detect the exact moment when transmission ceases, the system has to be provided with a device for detecting the end of transmission and allowing the time interval between the exact end of transmission and the detection of said end of transmission, to be reduced to a minimum.

The easiest way to detect the end of transmission consists in adding a series of "zeroes" to the data. After reception of a certain number of "zeroes" by the receiving device, the detection logic unit determines and signals that transmission is terminated. Unfortunately, some line disturbances are sufficient to prevent the end of transmission from being detected.

Another method consists in using a protocol indicating the end of transmission by a particular sequence of bits. This method has several drawbacks. First of all, unlike the sequence of "zeroes", it does not allow a line cut-off to be detected since in this case, the detection logic unit does not receive said particular sequence of bits. Further, this method excludes some combinations of bits used as said particular sequence of bits and consequently, requires a system with a larger processing capacity. In addition, if an efficient noise protection is required, a particular sequence long enough is to be used, which therefore increases the time needed to detect said end of transmission.

In order to overcome the above-indicated drawbacks and to be also able to detect an end of transmission caused by a line cut-off, a method consisting in detecting the energy drop of the received signal has been used. Said received signal is sampled, the energy is measured for each sample and a comparison with a predetermined threshold is performed.

The latter method can be advantageously applied in the transmission systems using phase modulation. But in the present high speed systems using modulation states taken from constellations with a plurality of amplitude levels, the end of transmission can happen either on a high or low level of amplitude. The signal energy will take more or less time to go below the predetermined energy threshold according to whether the end of transmission happens on a high or low level of amplitude. Therefore, it is impossible to have a perfect knowledge of the time interval between the end of transmission and the detection of said end of transmission.

OBJECTS AND BRIEF DESCRIPTION OF THE INVENTION

Therefore, an object of the invention is to provide a method for a quick detection of the energy drop of a signal received by the receiver of a data transmission system whether said energy drop is caused by an end of data transmission or by a line cut-off.

Another object of the invention is to provide a method for a quick detection of the energy drop of a signal received by the receiver of a data transmission system, the time interval between the energy drop and the detection thereof being independent of the signal energy level at the moment of the energy drop.

Another object of the invention is to provide a device for detecting the end of energy of a signal received by the receiver of a data transmission system and embodying the method of the invention.

The method of the invention comprises various steps consisting in digitally integrating each sample of the data signal to obtain a signal representing the energy of said signal, storing the energy value of the sample of the signal representing the energy from which the energy decrease rate exceeds a predetermined value, comparing on each sampling time, the stored energy value with the energy value of each sample of the signal representing the energy and producing an energy drop signal when the comparison shows that the energy value of a sample of the signal representing the data signal energy is less than a predetermined fraction of the stored energy value.

Another feature of the invention consists in comparing the value of the signal representing the data signal energy with a minimum energy value and producing a signal indicating the energy drop when the value of the signal representing the energy has fallen below the minimum energy value.

The detecting device embodying the method of the invention, includes digital integrating means to obtain, on each sampling time, a signal representing the data signal energy; means for storing the energy value of the sample of the signal representing the data signal energy from which the energy decrease rate exceeds a predetermined value; and threshold means to provide an energy drop signal when the energy value of the sample of the signal representing the data signal energy becomes less than a predetermined fraction of the energy value stored in the storage means. An embodiment of the invention is described in the following with reference to the accompanying drawings in which:

BRIEF DESCRIPTION OF THE DRAWINGS

FIG. 4 shows various signal curves with an energy drop being detected by the energy drop detector of this invention.

DETAILED DESCRIPTION OF THE INVENTION

Figure 1:
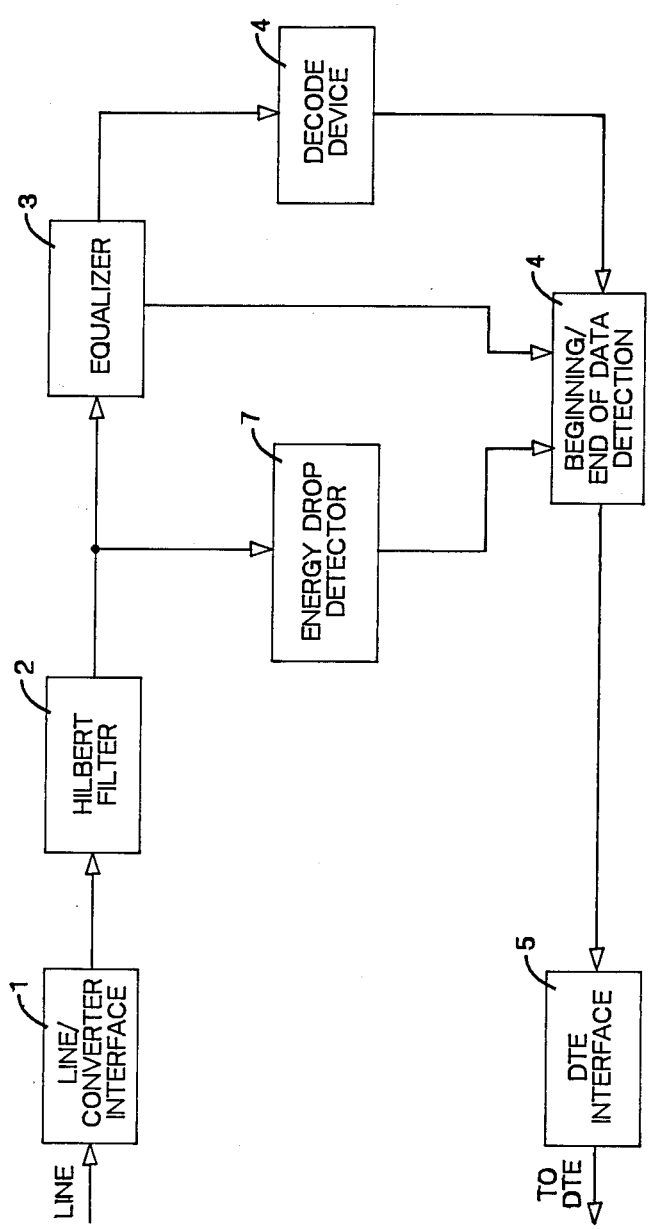
FIG. 1 shows a data receiving device provided with an energy drop detector according to this invention.

The energy drop detecting device of this invention can be used in a data receiving device as the modem schematically shown in FIG. 1.

The analog signal received through the line is shaped, adapted and converted into a digital signal in line/converter interface 1. The digital signal is processed by Hilbert filter 2 which, in addition to the filtering function thereof, provides the in phase and quadrature components of the received signal to equalizer 3 which equalizes the signal spectrum frequency. Then the digital signal is decoded in decoding device 4 which outputs the digital data flow as transmitted by the transmitting device.

Prior to being provided to DTE interface 5 to be transmitted to the data terminal equipment (DTE), the digital data which appear as a series of bits outputted by decoding device 4, are processed by a beginning/end of data detecting device 6. Data beginning can be detected from the equalizer as shown in FIG. 1, by correlating two different points of the equalizer and is not an object of this invention and therefore, will not be described in this specification. End of data is detected in response to the energy drop signal provided by energy drop detector 7 of this invention from the digital signal components outputted by Hilbert filter 2.

The energy drop detector of this invention will be described in the following with reference to FIG. 2.

Digital in-phase and quadrature components X and Y provided by the Hilbert filter are squared by multipliers 11 and 12 prior to being added by adder 13. Therefore adder 13 outputs a digital signal A representing the squared module $(X^2+Y^2)$ of the signal to be analyzed, thus freed from the phase constraints.

The samples of signal A are transmitted to the input of a digital integrator the purpose of which is to provide the time-distributed mean energy of the signal to be analyzed. It is to be noted that the sampling frequency applied to the signal should be at least equal to twice the data modulation rate in order to satisfy the sampling theorem.

The digital integrator is comprised of two multipliers 14 and 15, an adder 16 and a register 17.

Adder 16 outputs a signal $B_{(n)}$ representing the energy of the signal to be analyzed. On each sampling time, the value of the energy signal which is referenced $B_n$ to indicate that sampling time n is concerned, is stored into register 17.

On sampling time n, adder 16 receives as inputs, on the one hand, the value of signal $A_n$ multiplied by factor K1 in multiplier 14 and on the other hand, energy signal value $B_{n-1}$ which has been stored into register 17 on sampling time $n-1$, multiplied by factor K2 in multiplier 15. Therefore Energy signal value $B_n$ outputted by adder 16 can be written as follows:

$$B_n = K1.A_n + K2.B_{n-1}$$

Factor K1 is the scale factor and factor K2 allows the time constant of the digital integrator to be adjusted. In order to obtain an energy signal with an amplitude equivalent to the one of the input signal, K1 and K2 are chosen as follows:

$$K1 + K2 = 1$$

The following values are more particularly suitable:

$$K1 = \frac{1}{16} \text{ and } K2 = \frac{15}{16}$$

Energy signal value $B_n$ and value $B_{n-1}$ outputted by register 17 and multiplied by factor K3 in multiplier 18, are applied as inputs to comparator 19. When value $B_n$ exceeds or is equal to $(K3.B_{n-1})$, comparator 19 outputs a "1". When the output of comparator 19 is a "1", AND circuit 20 is conducting, which allows energy value $B_n$ to be transferred into register 21.

Therefore, it appears that on each sampling time, register 21 is loaded with energy value $B_n$ provided on this sampling time as long as said value satisfies the following relation:

$$B_n > K3 \cdot B_{n-1}$$

$$\frac{B_n}{B_{n-1}} > K3$$

If K3 is chosen slightly lower than 1, for instance $K3 = 63 > 64$, it appears that a new value of the energy signal is stored into register 21 on each sampling time as long as the energy signal decrease rate $$1 - B_n/B_{n-1}$$

does not exceed a certain predetermined value, for instance in this example $$1 - K3 = 1/64$$

In contrast, when value $B_n$ is such that $B_n/B_{n-1} < K3$, comparator 19 outputs a value "0" which disables AND circuit 21 and $B_n$ is not stored into register 21 still containing $B_{n-1}$. Consequently, register 21 remains unchanged when the signal decrease rate exceeds a predetermined value (for instance 1/64).

It is to be noted that this invention is not restricted to the above described embodiment in which value $B_n$ is only compared to $B_{n-1}$. Thus, register 21 could be loaded with value $B_n$ obtained on sampling time n provided that the relation given below is satisfied.

$B_n = a1.B_{n-1} + a2.B_{n-2} + a3.B_{n-3} + \ldots$ where $B_{n-1}$, $B_{n-2}$, $B_{n-3} \ldots$ are the energy values provided on sampling times $n-1, n-2, n-3, \ldots$ etc. A circuit embodying such a relation is well known by a man skilled in the art and will not be described here. Value $B_n$ of the energy signal on sampling time n also forms an input to comparator 23. The second input of said comparator is value $B_s$ of the energy signal stored in register 21 by that time, multiplied by a factor K4 by multiplier 22. It is to be noted that this value $B_s$ can be a value of the energy signal stored into the register several sampling times before since as just explained above, register 21 is updated only when a new energy level signal value is less than a predetermined fraction of the immediately previous energy level signal.

Depending whether value $B_n$ is greater or smaller than $K4.B_s$, comparator 23 outputs a "1" or a "0". Factor K4 being between 0 and 1, this means that the comparator provides an outputs "0" only when the value of energy signal $B_n$ on sampling time n is such that:

$$B_n < K4 \cdot B_s$$

i.e. said value has fallen below a predetermined percentage of threshold value $B_s$. A value $K4 = \frac{3}{8}$ is particularly appropriate for implementing this invention. The output of comparator 23 controls an input of NAND circuit 24. Consequently, when the output of comparator 23 provides a "0", i.e. an energy drop has been detected as explained with reference to FIG. 2, a "1" bit is transmitted through output S 25.

Sometimes energy value $B_n$ is so low that it is not necessary to use the above described energy drop detecting device. In this case, value $B_n$ is compared with a minimum value $B_m$ in a comparator 26. When value $B_n$ becomes smaller than $B_m$ comparator 26 provides a "0" output which is transmitted to the input of NAND circuit 24 which in turn, provides a "1" bit on line S 25.

Figure 2:
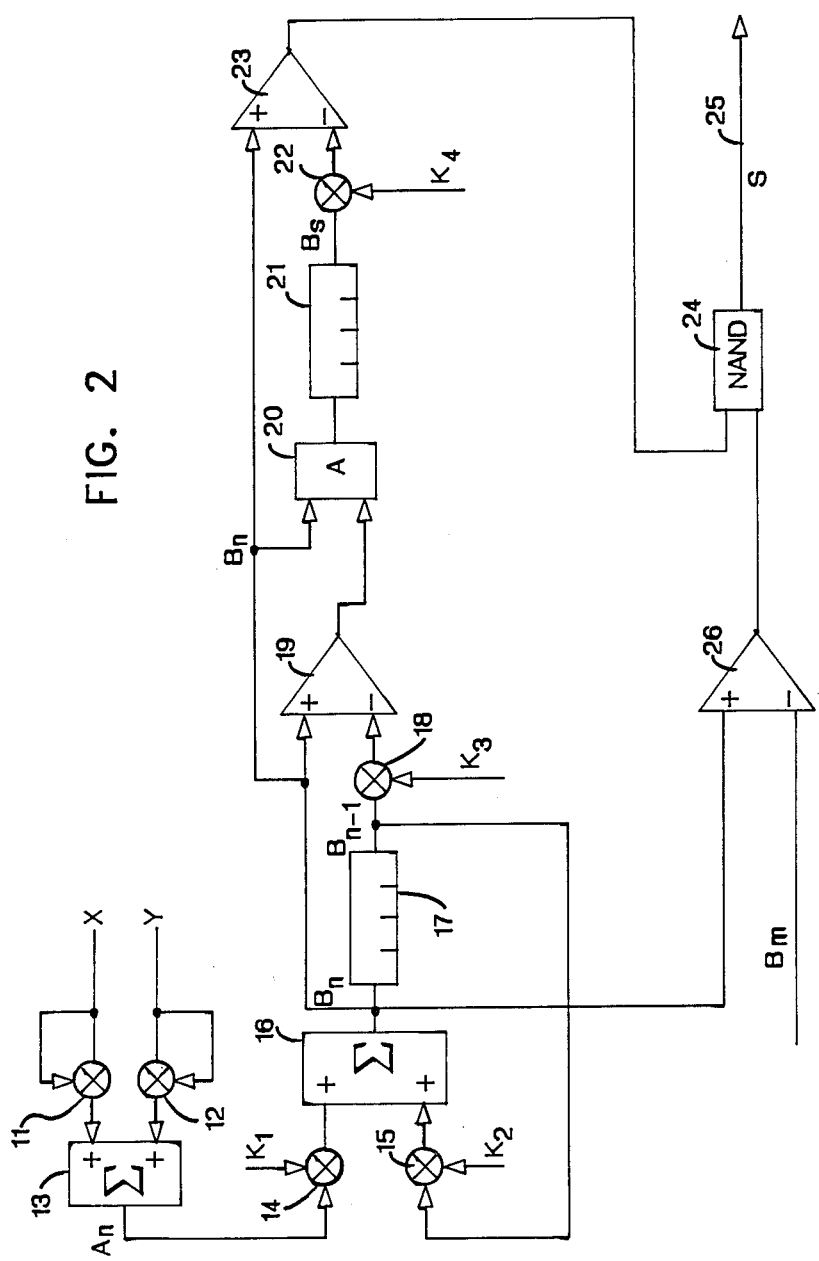
FIG. 2 shows an energy drop detector according to this invention.
Figure 3:
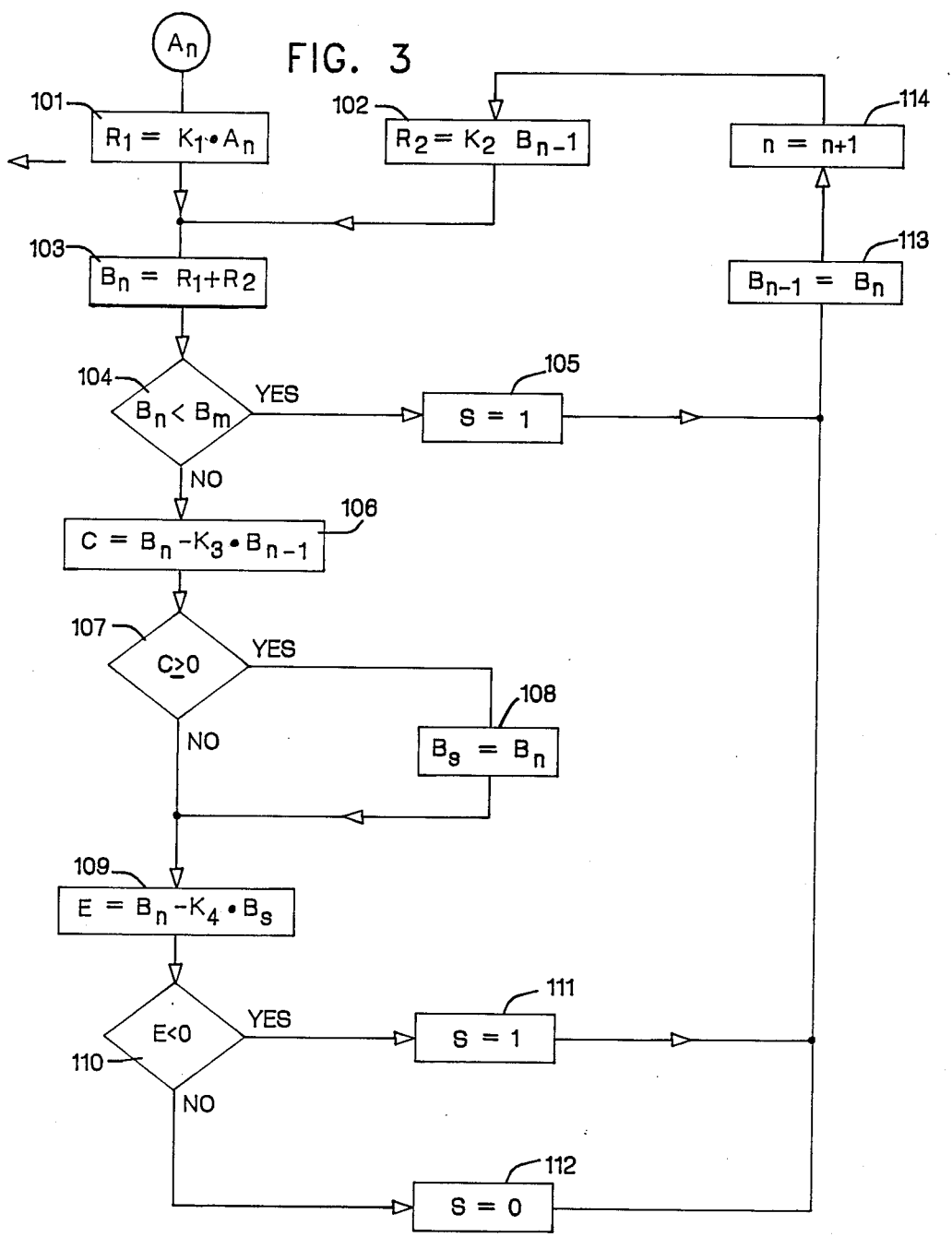
FIG. 3 is a flowchart schematically showing the various steps of the energy drop detecting method of this invention.

While FIG. 2 illustrates a hard-wired embodiment of the invention, the invention may also be implemented by a properly programmed microprocessor. FIG. 3 is a flow chart illustrating the programming steps necessary to implement the full equivalent of the circuit illustrated in FIG. 2. Those skilled in the programming art will be able to prepare a program in conformity with the flow chart of FIG. 3 for any given microprocessor selected.

On each sampling time, instructions 101 and 102 load registers R1 and R2 with the value of the sample of received signal $A_n$ and the value of energy signal $B_{n-1}$ respectively multiplied by factors K1 and K2. On step 103, register $B_n$ is loaded with the sum of the contents of R1 and R2. Then instruction 104 checks whether $B_n$ is smaller than a predetermined minimum value $B_m$. If yes, register S is loaded with value 1 (step 105) indicating that the signal energy has dropped below value $B_m$. If no, on step 106 register C is loaded with the following value:

$$B_n - K3 \cdot B_{n-1}.$$

Step 107 determines whether C is above or equal to 0, in which case register Bs is loaded with value $B_n$ on step 108. After step 108 and when C is not above or equal to 0, i.e when the signal energy decrease rate exceeds a predetermined value, register E is loaded with the following value:

$$B_n - K4 \cdot Bs$$

on step 109. Then step 110 determines whether the contents of register E is lower than zero. If yes, i.e the energy signal value has fallen below a predetermined percentage of threshold value Bs, register S is loaded with value 1 on step 111. If no, register S is loaded with value 0 on step 112.

When register S is loaded with a new value on step 105, 111 or 112, the program goes to step 113 which loads register $B_{n-1}$ with value $B_n$. Then, on step 114, a counter is incremented from n to n+1 so that the program is looped on the following sampling time.

As indicated above, the method of this invention allows the time interval between the energy drop and the detection thereof to be made independent of the signal energy level at the moment of energy drop.

Thus, FIG. 4 shows two possible cases of energy drop. In the first case, energy drops from value $B_n$ stored in register 21 of FIG. 2. Detection is performed when the energy value goes down to $B_{n+N}$, N sampling times later. In the second case, energy drops from value $B'_n$ stored in register 21 and detection is performed when the energy value goes down to $B'_{n+N'}$ also N sampling times later.

This can be easily explained. In effect, value $B_n$ from which energy drops, is such that the value obtained on the next sampling time satisfies the following relation:

$$B_{n+1} = K3^{B_n} \quad (1)$$

and so on for all the following values. Therefore value $B_{n+N}$ for which a detection signal is provided, is such that:

$$B_{n+N} = (K3)^N \cdot B_n \quad (2)$$

As explained above, the energy drop detection signal is produced when the value of the energy signal is equal to a predetermined value of the value ($B_n$) stored in register 21. Therefore:

$$B_{n+N} = K4 \cdot B_n \quad (3)$$

The comparison of equations (2) and (3) shows that:

$$(K3)^N = K4$$

and that the number of sampling times N is independent of the energy level, $B_n$ or $B'_{n'}$ at the time of energy drop.

The above description shows that the method and the device of the invention ensure a detection of the energy drop which does not depend of the energy level at the moment of energy drop or the cause of this drop which can be either due to the end of data transmission or to a line cut off. In addition, the choice of factors $K_1$, $K_2$, $K_3$ and $K_4$ allows to a great extent the user to obtain results with more or less accuracy.

While there have been described two possible embodiments of this invention, it will be obvious to those skilled in the art that various changes and modifications may be made therein without departing from the invention and it is therefore intended to cover all such changes and modifications as fall within the true spirit and scope of the invention.

I claim:

1. A method for detecting a drop in an energy level of a data signal (An) obtained by digital sampling of an analog signal received in a data transmission system, said method including the following steps of:
   integrating each sample (An) of the data signal to obtain a signal (Bn) representing the energy level of the integrated sample;
   comparing energy level signal (Bn) with the energy level signal (Bn−1) for the previous integrated sample;
   storing the energy level signal (Bs) equal to energy level signal (Bn) whenever the comparing step shows that energy level signal (Bn) is less than a predetermined fraction (K3) of the previous energy level signal (Bn−1);
   comparing each energy level signal (Bn) with the stored energy level signal (Bs); and
   producing an energy drop signal (S) when the comparison indicates that the current energy level signal (Bn) is less than a predetermined fraction (K4) of the stored energy level signal (Bs).

2. A method according to claim 1 wherein the integrating step further comprises the step of summing the products (K1*An) and (K2*Bn−1) where K1 and K2 are predetermined constants.

3. A method according to claim 2 characterized in that said factors K1 and K2 satisfy the relation $K1+K2=1$.

4. A method according to claim 3 characterized in that $K1=1/16$ and $K2=15/16$.

5. A method according to any one of claims 1, 2, 3, and 4 characterized in that the values ($A_n$) of said data signal are equal to the sum of the squares of the digital components in phase and quadrature of the digital signal.

6. A method according to any one of claims 1, 2, 3 and 4 including the additional steps of:
   comparing the energy level signal (Bn) for the current integrated sample with a minimum value (Bm); and
   producing an energy drop signal whenever the comparison shows that (Bn) is less than (Bm).

7. A data signal energy drop detector for use in the receiving system of a data transmission system comprising:
   means (14, 15, 16, 17) for integrating each digital sample (An) of a received signal to provide a signal (Bn) representing the energy level of the current integrated sample;
   means (19, 20, 21) for setting a stored energy level signal (Bs) equal to (Bn) only when energy level signal (Bn) is less than a predetermined fraction (K3) of the energy level signal (Bn−1) for the previous integrated sample; and
   threshold means (22, 23, 24) for comparing the energy level signal (Bn) with a predetermined fraction (K4) of the stored energy level signal (Bs) to produce an energy drop signal (S) when the comparison shows that (Bn) is less than the predetermined fraction (K4) of (Bs).

8. A detector according to claim 7 characterized in that said integrating means include:
   a first multiplier (14) for multiplying sample ($A_n$) of the signal received on a sampling time n, by a factor (K1) and a second multiplier (15) for multiplying sample ($B_{n-1}$) of said energy signal obtained on preceding sampling time n−1, by factor (K2);
   an adder (16) for summing the signals obtained from the output of said first and second multipliers, and
   a register (17) for storing sample ($B_{n-1}$) of said signal representing the energy of the data signal provided on sampling time n−1.

9. A detector according to claim 8 characterized in that said storage means includes:
   a multiplier (18) for multiplying the value of the sample of said signal representing the energy of the data signal provided on sampling time n−1, by a factor (K3);
   a comparator (19) for comparing the signal output by said factor (K3) multiplier with the value of sample (Bn) of said signal representing the energy of the data signal obtained on sampling time n;
   an AND circuit for transmitting the value of said sample ($B_n$) obtained on sampling time n when said comparator provides a signal indicating that said value exceeds the product of the value ($B_{n-1}$) obtained on sampling time n−1, by said factor (K3), and
   a register (21) for storing said value ($B_n$) transferred through said AND circuit.

10. A detector according to any one of claims 7, 8, 9 further including a comparator (26) comparing the value (Bn) of the sample of the signal representing the data signal energy with a minimum energy value ($B_m$), said comparator providing a signal indicating an energy drop when said value (Bn) is less than said minimum value.

* * * * *